Figure 1:
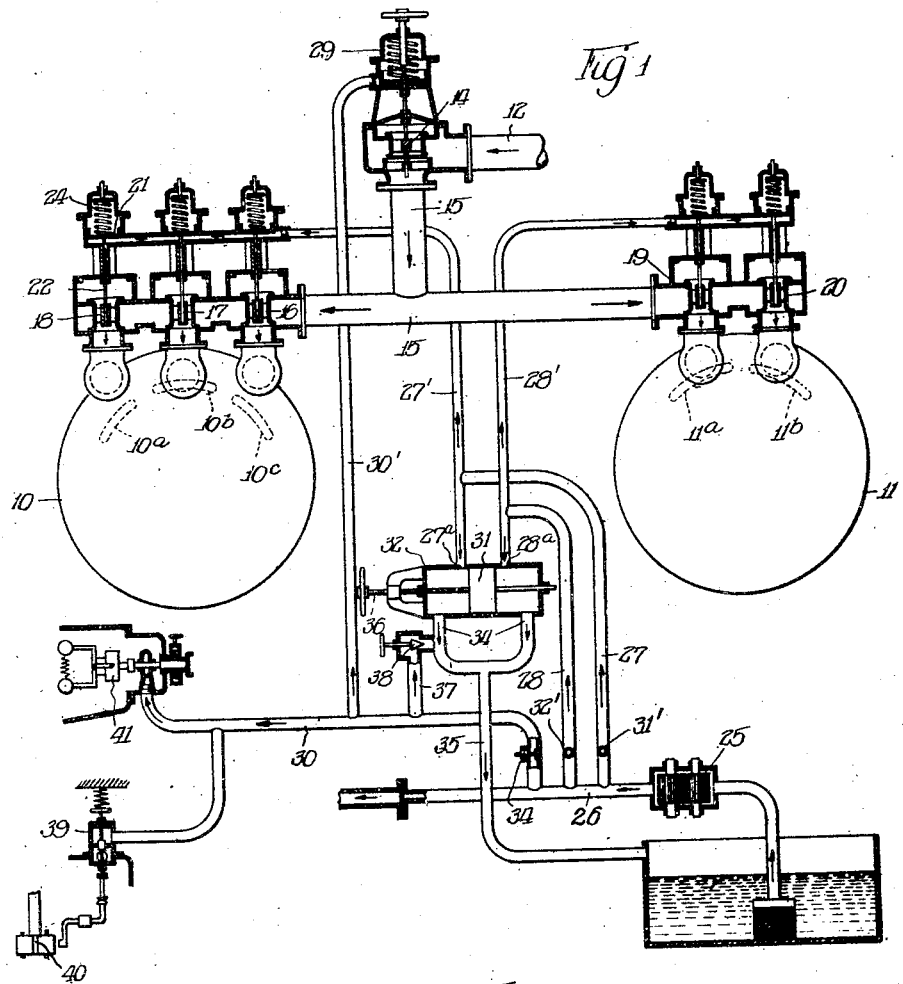

June 24, 1930.  A. MEYER  1,766,527

CONTROL GEAR FOR TURBINE PLANTS

Filed Aug. 22, 1927

Witness:
P. Burkhardt

Inventor:
Adolf Meyer,
By Cromwell, Bristol & Warren
Attys.

Patented June 24, 1930

1,766,527

UNITED STATES PATENT OFFICE

ADOLF MEYER, OF KUSNACHT, NEAR ZURICH, SWITZERLAND

CONTROL GEAR FOR TURBINE PLANTS

Application filed August 22, 1927, Serial No. 214,564, and in Germany August 28, 1926.

This invention relates to apparatus for controlling steam supply to turbines which are subject to demands which vary over substantial ranges, both as to load and speed.

The general object of the invention is the provision of apparatus which will facilitate and simplify the operations for obtaining the desired changes and regulation of the steam supply to meet the various conditions of demand for power and speed, which will enable accurate control of the operation of the turbine to be exercised within wide ranges and in close variations, and which will effect quick response in the controlled machine.

Another object is the provision of apparatus having the characteristics above specified which may be employed for the control of a plurality of turbines either conjointly or selectively.

A third object is the provision of control apparatus particularly adapted for turbines employed for ship propulsion.

Other and further objects will be pointed out or indicated hereinafter, or will appear to one skilled in the art upon an understanding of the invention or its employment in practice.

In the drawing forming a part of this specification, I illustrate one fashion in which the invention may be applied in use, but it is to be understood that this is presented for purpose of illustration only, as the invention which I claim may find structural embodiments and applications in practice differing in many respects from the example herein illustrated and described.

Figure 2:
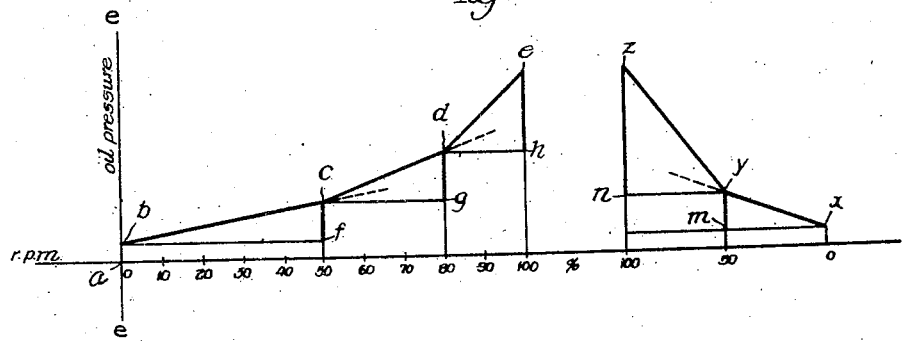

In the drawing,

Fig. 1 is a diagrammatic illustration of control apparatus, embodying my invention, for control of two turbines adapted for selective operation; and Fig. 2 is a diagram illustrating the valve ranges of two turbines.

In most turbine installations it is customary to regulate them to constant speed automatically by a centrifugal governor which controls admission to the various nozzle groups or stages of the turbine. In some installations, however, such as marine installations, wherein the propellers are driven by turbines, requirements for both load and speed variations may occur simultaneously, hence such installations cannot be governed in the manner mentioned. For control of installations of the second kind, consequently, it has been the practice to regulate the power and speed by selective operation of the valves controlling the various nozzle groups or stages, separately as required. Such control is troublesome and circuitous, however, and where maneuvering gear is employed for reducing the number of operations, the apparatus becomes undesirably complex. All of these difficulties are particularly pronounced in installations where large quantities of steam, requiring large valves, must be dealt with, or when the powers and speeds fluctuate between wide limits, as on battleships, for example. The present invention provides an apparatus whereby the control, for speed and power variations, is rendered direct, so that quick response is obtained, and in which the control gear is comparatively simple in construction and the necessary operations for varying the speed or power are few, simple and easily performed.

The nature of the invention will be most quickly ascertained by reference to the example illustrated diagrammatically in the drawing. It may be assumed that this is a marine installation in which the turbine 10 is the ahead turbine, having the three nozzle groups $10^a$, $10^b$ and $10^c$, and the turbine 11 is the astern turbine having the two nozzle groups $11^a$ and $11^b$. Steam is supplied to the turbines from the main 12 through the main stop valve 14 and the connections 15. The respective nozzle groups $10^a$, $10^b$ and 10ᶜ of the turbine 10 are supplied through the nozzle inlet valves 16, 17 and 18, and the respective nozzle groups 11ᵃ and 11ᵇ of the turbine 11 through the nozzle valves 19 and 20. These nozzle valves are controlled by respective oil relays, each comprising a piston 21 connected to its valve by a rod 22 and loaded by a spring 24 which tends to close the valve. The pistons may be raised against the pressure of their loading springs, to open the valves, by oil supplied under pressure from a pump 25, said pump being operated to maintain a constant rate of supply to the pipe 26. The pressure oil is supplied to the relays of the turbine 10 through pipes 27 and 27', and to the relays of the turbine 11 through pipes 28 and 28'. The stop valve 14 is equipped with an oil relay 29 similar in construction and operation to those of the nozzle valves, oil being supplied to the relay 29 by way of pipes 30 and 30'. Pipes 27, 28 and 30 are equipped with valves 31', 32' and 34 respectively by means of which their oil flow capacity may be adjusted to suit the conditions peculiar to the installation. The spring loading of the valves 16, 17 and 18 is predetermined and established in such relationship that said valves open respectively at different pressures of the oil under their pistons, and each opens through its range to an extent varying with the pressure of the oil, the oil pressure and the loading spring pressure being in equilibrium throughout the range of operation of the valve. This is illustrated graphically in Fig. 2, in which the ordinates represent oil pressure. The distance $a—b$ represents the initial compression of the loading spring on the first nozzle valve 16 of the ahead turbine. This valve starts to open at the pressure $b$ and is fully open at the pressure $c$, at which point the valve 17 commences to open, reaching its fully open position under pressure $d$, and valve 18 likewise opens through its range under the range of pressure $d—e$. In like fashion, the nozzle valve 19 of the astern turbine is operated through the pressure range $xy$ and the valve 20 under the range $yz$. The vertical distances $cf$, $dg$ and $eh$ represent the actual effective valve lifts of the respective nozzle valves of the ahead turbine, and likewise $ym$ and $zn$ represent those for the valves of the astern turbine.

For control of the valve operating gear, a setting device is employed, by which the base or mean effective pressure of the oil may be varied. This setting device includes a valve 31 operating in a housing 32 to which the pipes 27 and 28 have connection by ports 27ᵃ and 28ᵃ respectively at opposite sides of valve 31. This housing has outlet connection at 34 with the discharge pipe 35. By means of an adjusting device 36, valve 31 may be moved to throttle either of ports 27ᵃ and 28ᵃ to vary the loss of oil from pipe 27 or pipe 28 as the case may be. With valve 31 in the mid-position as illustrated, ports 27ᵃ and 28ᵃ are both completely open so that the entire momentary feed of oil from pipes 27 and 28 is discharged through housing 32 and return pipe 35 and all the nozzle valves remain seated under the pressure of their springs. By the shifting of valve 31 to the left, port 27ᵃ is throttled, causing pressure to build up in pipe 27' and under the pistons of the nozzle valve relays of turbine 10. Valve 31 may thus be set to establish any desired oil pressure, represented by any point along the line $e—e$ of Fig. 2, whereupon the valve or valves whose relays are responsive to the oil pressure of the selected valve will be opened to the extent corresponding to that pressure of the oil. Considering the abscissæ in Fig. 2 as representing revolutions per minute (in percentages), it is apparent that by suitable adjustment of the setting device, the requisite valve opening and steam admission may be obtained for any speed desired. It will be apparent that when the setting valve 31 is in throttling relationship to port 27ᵃ, port 28ᵃ remains open, and the valves of turbine 11, as a consequence, remain closed. A like effect is accomplished when the setting valve 31 is shifted into throttling cooperation with port 28ᵃ, a pressure corresponding to the setting of the valve 31 being built up in pipe 28' to accomplish the desired opening of a nozzle valve or valves of turbine 11, all nozzle valves of turbine 10 remaining closed at such time. Thus, through operation of the setting device, a selection is exercised as between the turbines and as between different speeds of the selected turbine.

Pipe 30 has a discharge connection 37 which is controlled by a valve 38 to vary the rate of discharge, and thereby predetermine or establish the mean position of the emergency shut-off valve 14. Pressure under the piston of valve 14 may be completely relieved through the emergency valve 39 which may be tripped by the action of the emergency speed governor 40, driven from the turbine shaft, to open when a critical speed is attained. Upon such occurrence, valve 14 will be seated immediately and steam supply to whichever turbine is operating will be cut off. Through the medium of a centrifugal governor 41, driven from the turbine shaft and effective to regulate oil pressure in relay 29, in a well known fashion, control may be exercised on valve 14 to maintain constant speed at the rate for which the setting device is adjusted. By the opening of valve 38, the oil pressure may be entirely relieved from the relay 29, and the stop valve 14 completely closed, when desired.

In addition to the simplification in the operation of various groups of valves, which may be of large size, afforded by this invention, it is to be observed that it accommodates an extensive range and variation of speed, and does not necessitate fixed positions for the individual valves. Consequently, in addition to increasing accuracy and certainty of control, and quickness of response, it gives great flexibility in both power and speed performances.

I claim:

1. In control gear for steam turbines, the combination with a plurality of turbines, each having a plurality of steam admission ports, of different valves for controlling steam admission to the respective ports, an oil relay for operating each valve, means for supplying pressure oil to the relays, the different valves of the respective turbines being differently loaded to open under different pressures of the oil, and a setting device operable to predetermine the oil pressure effective on the relays of either turbine.

2. In control gear of the character described, a plurality of turbines each having a plurality of fluid admission ports, a valve for controlling admission to each of the ports, a liquid operated relay for each valve, means for supplying liquid under pressure to the relays, the valves of each turbine being differently loaded to open under different pressures of the liquid, and a setting device for rendering the liquid pressure effective on the relays of certain of said turbines and at the same time ineffective on the relays of certain other turbines.

3. In control gear of the character described, a plurality of turbines each having a plurality of fluid admission ports, an admission valve for controlling fluid admission to each port, a relay operable by liquid pressure to open each admission valve, the different admission valves of each turbine being differently loaded to open under different pressures of the liquid, a setting device for predetermining the liquid pressure effective on the relays of either turbine, a supply valve for controlling supply of fluid to the admission valves, and a speed-responsive governor for controlling the position of the supply valve.

4. In control gear for steam turbine installations, the combination with a turbine having a plurality of admission ports, of an admission valve for controlling steam supply to each port, a relay operable by oil pressure to open each valve, means for supplying oil under pressure to said relays, the different valves being differently loaded to open under different pressures of the oil, a supply valve for controlling supply of steam to the admission valves, a speed-responsive governor for controlling position of the supply valve, and a setting device for predetermining the oil pressure effective on the relays.

5. In control gear of the character described, motive power machines, means common with respect to said machines for controlling operating conditions thereof, said means including a fluid-pressure system, and means forming part of said control means and disposed in said system and being operable to render the same effective selectively with respect to said machines.

In testimony whereof I have hereunto subscribed my name this 26th day of July, A. D. 1927, at Zurich, Switzerland.

ADOLF MEYER.